(12) United States Patent
Hodgson et al.

(10) Patent No.: US 9,982,583 B2
(45) Date of Patent: May 29, 2018

(54) DOSING VALVE FOR ADDITIVES AT RISK OF FREEZING, METHOD FOR PRODUCING A DOSING VALVE AND MOTOR VEHICLE (71) Applicant: EMITEC GESELLSCHAFT FUER EMISSIONSTECHNOLOGIE MBH, Lohmar (DE)

(72) Inventors: Jan Hodgson, Troisdorf (DE); Sven Schepers, Troisdorf (DE); Rolf Brueck, Bergisch Gladbach (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 0 days. days.

(21) Appl. No.: 14/450,407

(22) Filed: Aug. 4, 2014

(65) Prior Publication Data
US 2014/0338630 A1    Nov. 20, 2014

Related U.S. Application Data (63) Continuation of application No. PCT/EP2013/052043, filed on Feb. 1, 2013.

(30) Foreign Application Priority Data

Feb. 3, 2012   (DE) .................. 10 2012 002 061

(51) Int. Cl.
*F01L 3/10*   (2006.01)
*F01N 3/20*   (2006.01)
(Continued)

(52) U.S. Cl.
CPC ........... *F01N 3/208* (2013.01); *F01N 3/2066* (2013.01); *F01L 1/28* (2013.01); *F01L 3/02* (2013.01);
(Continued)

(58) Field of Classification Search
CPC ....... F01L 3/10; F01L 3/08; F01L 3/02; F01L 1/28; F02B 2275/22
(Continued)

(56) References Cited

U.S. PATENT DOCUMENTS 3,620,204 A * 11/1971 Baltadonis ............ F02D 17/04
                                                      123/188.1
5,058,623 A   10/1991 Beagle et al.
(Continued)

FOREIGN PATENT DOCUMENTS

CN     101103185 A    1/2008
DE     4109868 A1    10/1992
(Continued)

Primary Examiner — Jacob Amick
Assistant Examiner — Charles Brauch
(74) Attorney, Agent, or Firm — Laurence A. Greenberg; Werner H. Stemer; Ralph E. Locher (57) ABSTRACT A dosing valve includes at least a valve housing with a duct, a valve body being movable in order to open and close the dosing valve and a spring exerting a spring force on the valve body and thus holding the valve body in a rest position. The spring is supported on at least one calibration body. The valve body, the spring and the at least one calibration body are disposed in the duct. The at least one calibration body is fastened in the valve housing at least by using a cohesive or material connection. A method for producing the dosing valve and a motor vehicle having the dosing valve are also provided.

20 Claims, 3 Drawing Sheets (51) Int. Cl.
  *F01L 3/02*  (2006.01)
  *F01L 1/28*  (2006.01)
  *F01L 3/08*  (2006.01)

(52) U.S. Cl.
  CPC . *F01L 3/08* (2013.01); *F01L 3/10* (2013.01); *F01N 2610/02* (2013.01); *F01N 2610/1453* (2013.01); *F02B 2275/22* (2013.01); *F02M 2200/505* (2013.01); *F02M 2200/8084* (2013.01); *Y02A 50/2325* (2018.01); *Y02T 10/24* (2013.01); *Y10T 29/49298* (2015.01)

(58) Field of Classification Search
  USPC ..................................................... 123/188.1
  See application file for complete search history.

(56) References Cited

U.S. PATENT DOCUMENTS

| | | | |
|---|---|---|---|
| 5,165,656 | A | 11/1992 | Maier et al. |
| 5,775,600 | A | 7/1998 | Wildeson et al. |
| 5,985,065 | A * | 11/1999 | Kling .................. B26D 7/086 156/251 |
| 6,116,273 | A | 9/2000 | Tarr et al. |
| 6,269,633 | B1 * | 8/2001 | van Nieuwstadt et al. .... 60/277 |
| 6,834,667 | B2 | 12/2004 | Sumiya et al. |
| 7,775,036 | B2 | 8/2010 | Barcin |
| 8,757,198 | B2 | 6/2014 | Santamaria et al. |
| 2002/0167197 | A1 * | 11/2002 | Freitag .................. B62D 25/04 296/193.01 |
| 2003/0094513 | A1 | 5/2003 | Luft |
| 2006/0037993 | A1 * | 2/2006 | Kyriakoglou ........ B23K 20/121 228/113 |
| 2007/0228082 | A1 * | 10/2007 | Jasper .................... B65D 83/54 222/402.1 |
| 2008/0006793 | A1 * | 1/2008 | Hirnschal ................ B21K 1/22 251/356 |
| 2008/0190492 | A1 | 8/2008 | Fuchs et al. |
| 2010/0192924 | A1 * | 8/2010 | Schweikart ........ F02M 37/0029 123/510 |
| 2015/0377105 | A1 | 12/2015 | Haesemann |

FOREIGN PATENT DOCUMENTS

| | | |
|---|---|---|
| DE | 19607013 A1 | 9/1997 |
| DE | 10158503 A1 | 8/2002 |
| DE | 102010012651 A1 | 9/2010 |
| DE | 102010030925 A1 | 1/2012 |
| EP | 1314864 A1 | 5/2003 |
| EP | 1467086 A1 * | 10/2004 |
| JP | H02209680 A | 8/1990 |
| JP | 2008540934 A | 11/2008 |
| JP | 2009138627 A | 6/2009 |
| JP | 2011519738 A | 7/2011 |
| JP | 2012021457 A | 2/2012 |
| JP | 2016507028 A | 3/2016 |
| KR | 20000029652 A | 5/2000 |
| WO | 0210583 A1 | 2/2002 |

* cited by examiner

DOSING VALVE FOR ADDITIVES AT RISK OF FREEZING, METHOD FOR PRODUCING A DOSING VALVE AND MOTOR VEHICLE

CROSS-REFERENCE TO RELATED APPLICATION

This is a continuation, under 35 U.S.C. § 120, of copending International Application No. PCT/EP2013/052043, filed Feb. 1, 2013, which designated the United States; this application also claims the priority, under 35 U.S.C. § 119, of German Patent Application DE 10 2012 002 061.9, filed Feb. 3, 2012; the prior applications are herewith incorporated by reference in their entirety.

BACKGROUND OF THE INVENTION

Field of the Invention

The invention relates to a dosing valve for additives at risk of freezing. Such a dosing valve may be used for dosing a liquid from a pressurized accumulator. The invention also relates to a method for producing a dosing valve and a motor vehicle having a dosing valve.

The dosing valve is suitable, in particular, for dosing a liquid additive that is at risk of freezing. Such a liquid additive that is at risk of freezing is, for example, a urea-water solution. Urea-water solution is generally used for exhaust-gas purification in exhaust-gas treatment devices in the automotive field. In recent times, in exhaust-gas treatment devices for the purification of the exhaust gases of internal combustion engines in motor vehicles, increasing use has been made of the SCR [Selective Catalytic Reduction] method. In that method, nitrogen oxide compounds in the exhaust gas are reduced to form non-hazardous substances. For that purpose, a urea-water solution used as a reducing agent precursor, or ammonia used as a reducing agent, is fed to the exhaust-gas treatment device. The urea-water solution is converted to form ammonia thermolytically (by using high temperatures) and/or hydrolytically (with assistance from a catalytic converter). The nitrogen oxide compounds in the exhaust gas react with the ammonia to form non-hazardous substances (in particular to form $CO_2$, water and nitrogen). The additive is, for example, a urea-water solution.

In order to carry out exhaust-gas purification, widespread use is made of a 32.5% urea-water solution that is available under the trademark AdBlue®. The urea-water solution freezes at −11° C. In the automotive field, such low temperatures can arise, in particular, during long standstill phases.

An SCR dosing system may be constructed in such a way that, even during the standstill phases, liquid additive is present in a dosing valve provided for dosing the liquid additive. The SCR dosing system is thus not evacuated in the event of a shutdown. The SCR dosing system must therefore be configured in such a way that it is not damaged as a result of freezing of the reducing agent. Nevertheless, all of the components of the SCR dosing system, in particular the dosing valve, should at the same time be as inexpensive as possible.

SUMMARY OF THE INVENTION

It is accordingly an object of the invention to provide a dosing valve for additives at risk of freezing, a method for producing a dosing valve and a motor vehicle, which overcome the hereinafore-mentioned disadvantages and solve or at least alleviate the highlighted technical problems of the heretofore-known valves, methods and vehicles of this general type and in which a particularly advantageous dosing valve is provided which is capable of withstanding freezing.

With the foregoing and other objects in view there is provided, in accordance with the invention, a dosing valve comprising at least a valve housing with a duct and with a valve body which is movable so as to open and close the dosing valve, and a spring which exerts a spring force on the valve body and thus holds the valve body in a rest position, wherein the spring is supported on at least one calibration body, the valve body, the spring and the at least one calibration body are disposed in the duct, and the at least one calibration body is fastened in the valve housing at least by a cohesive or material connection.

The dosing valve preferably has at least one inlet through which liquid additive can pass into the dosing valve. Furthermore, the dosing valve preferably has at least one outlet through which liquid additive can be dispensed from the dosing valve in dosed fashion. There is preferably a flow path through the dosing valve from the inlet to the outlet, so that the liquid additive can follow the flow path from the inlet to the outlet and the flow path can be closed by the valve body. During the operation of the dosing valve, the flow path is at least partially filled with the liquid additive. If the flow path from the inlet to the outlet is to be opened up, the valve body is moved in order to open the dosing valve. The valve body is held in a rest position by the spring by virtue of the spring exerting a spring force on the valve body. In the rest position, the valve body is preferably preloaded against a stop by using the spring and the spring force. The spring is supported against at least one calibration body. During the assembly of the dosing valve, the position of the calibration body is individually fixed in order to precisely set the spring force exerted by the spring on the valve body. The spring typically has a certain manufacturing tolerance such that the length of the spring in the relaxed state differs in different dosing valves (including different dosing valves from one manufacturing line). Through variable positioning of the at least one calibration body, the stress in the spring can be set such that the spring force is identical in all dosing valves from one manufacturing line. For this purpose, the calibration body is preferably inserted into the dosing valve with a defined force, which corresponds to the spring force. The inserted dosing body is then disposed in a certain position by the spring force and the force used for the insertion process, and is fixed there by using the cohesive or material connection.

The duct preferably forms, at least in sections, the flow path through the dosing valve (preferably from the at least one inlet to the at least one outlet). The valve housing is preferably constructed as a casting into which the duct is cast. It is also possible for the duct to be drilled or milled into the valve housing. The valve housing is preferably composed of plastic or of metal.

The quantity of liquid additive dosed by the dosing valve is determined by the opening time periods of the dosing valve. The dosed quantity is preferably proportional to the duration of the opening time periods of the valve. It is preferably the case that, when the valve is open, a constant volume flow rate of liquid additive flows through the valve, with the volume flow rate being dependent on various factors. Relevant factors for the volume flow rate are, for example, the liquid additive pressure prevailing at the valve, the viscosity of the liquid additive and/or the cross section and/or the shape of the flow path for the liquid additive through the dosing valve. Irregularities in the proportionality between the opening time periods and the dosing quantity can arise as a result of dosing valve opening and closing processes, which respectively form the beginning and end of opening time periods of the dosing valve. The irregularities can possibly be reduced or compensated by using corrective factors.

When the calibration body has been inserted into the valve with a defined force, the calibration body is fastened in the dosing valve by using a cohesive or material or metallurgical connection. A cohesive or material or metallurgical connection may, for example, be a brazed connection or a welded connection. In the case of a brazed connection as a cohesive or material connection, the connection is produced by using an additional material (a brazing material) which melts during the production of the connection and thereby connects both to the calibration body and also to the dosing valve. In the case of a welded connection as a cohesive or material connection, the material of the dosing valve and/or the material of the calibration body is melted and a fixed connection is generated as the molten material, of the dosing valve and/or of the calibration body, solidifies. The connection may be produced directly between the dosing valve and the calibration body.

The material of the calibration body and the material of the dosing valve, or the material of the valve housing, in the region of the cohesive or material connection are preferably metallic. The welded connection is preferably a metallic welded connection in which a metallic material of the calibration body and a metallic material of the valve housing are melted together. The welded connection is preferably produced in the presence of a protective gas in order to keep oxygen away from the weld location during the welding process and ensure particularly high quality of the welded connection.

The welded connection is particularly preferably punctiform. Such a welded connection can be produced by using a spot welding process. It is also possible for multiple punctiform welded connections to be formed between the calibration body and the valve housing, which welded connections are, for example, distributed on a circumferential line running around the (sleeve-shaped or cylindrical) calibration body. Punctiform welded connections may, for example, be produced by virtue of an electrical current flowing from the calibration body into the valve housing or vice versa at a punctiform contact location. As a result of the high electrical resistance at the contact location, the contact location is subjected to intense heating. As a result, the material of the calibration body and/or the material of the valve housing melt. The molten materials can flow into one another and thus form the punctiform welded connection. A punctiform welded connection is particularly suitable for the fixing of the calibration body in the valve housing because the production of a welded connection of that type in the explained manner can be particularly easily integrated into the production of a dosing valve.

It is also possible for the calibration body to be fastened in the valve housing by using a friction welding process. In the case of a friction welding process, heat is generated by friction between the calibration body and the valve housing, and the material of the valve housing and/or the material of the calibration body are melted in order to form a cohesive or material connection between the calibration body and the valve housing. The friction that is required may be generated, for example, during the insertion of the calibration body into the valve housing. It is, for example, possible for the calibration body to be inserted into an opening of the valve housing with a high-frequency rotational movement with alternating direction of rotation. That rotational movement may in each case take place over a few angular degrees (for example 5°) and then change its direction of rotation. It is preferable for the (sleeve-shaped or cylindrical) calibration body to have at least one projecting contact point and/or at least one projecting contact line which generate(s) defined contact between the calibration body and the valve housing during the insertion of the calibration body into the valve housing. The friction for forming the friction-welded connection is then preferably generated at the contact point or at the contact line. The material of the calibration body situated at the contact point and/or at the contact line preferably also melts, in such a way that the friction-welded connection is at least partially formed with the material. A particularly strong welded connection between the calibration body and the valve housing can be formed by using this method. The friction welding process is particularly suitable for forming an encircling linear welded connection between the calibration body and the valve housing.

It is furthermore possible for the calibration body to be fastened in the valve housing by using an ultrasound welding process. In order to carry out the ultrasound welding process, at the position of the welded connection, the material of the calibration sleeve and/or the material of the valve housing are heated and melted by using ultrasound waves in order to form a welded connection. The ultrasound waves can be generated by using a piezoelectric actuator and/or by using a magnetostrictive actuator. The actuators can convert electrical current into a high-frequency sound wave. The method for forming a welded connection can be performed particularly quickly, in such a way that it can be integrated particularly effectively into the production of a dosing valve.

Freezing liquid additive in the dosing valve can exert very high forces on those dosing valve components which adjoin the liquid additive. In particular, water-based liquid additives (such as, for example, urea-water solution) expand as they freeze, so that very high pressures can be generated.

It has been found that, by using a cohesive or material connection, the calibration sleeve can be fastened in the valve housing such that no permanent displacement or deformation of the calibration sleeve occurs as a result of ice pressure that arises. In this way, the spring force exerted on the valve body by the spring is also not permanently changed.

The dosing valve may include not only the valve body, the spring and the calibration body but also further components such as, for example, a drive unit, seals, etc.

A drive unit of a dosing valve generally includes an electric drive. The drive is typically capable of exerting a force on the valve body, which force acts counter to the spring force in order to open the dosing valve. If the force exerted on the valve body by the drive exceeds the spring force, the valve body moves and the dosing valve opens. The valve body then opens up the flow path from the at least one inlet to the at least one outlet of the dosing valve. The force exerted on the valve body by the drive is normally a magnetic force. The valve body therefore preferably has at least one section composed of metal in order to ensure that a magnetic force of the drive can act on the valve body.

A cohesive or material connection can be integrated into the manufacture of a dosing valve with relatively little technical outlay, in particular if the cohesive or material connection is formed in addition to a press-fit connection between the dosing valve and the calibration body. It has been found that it would be significantly more cumbersome to produce a more stable press-fit connection because, for this purpose, the entire dosing valve housing would have to be of significantly more stable construction in order to be able to permanently withstand the high forces of the press-fit connection. It has proven to be particularly advantageous to use both a press-fit connection and also the described cohesive or material connection in order to fix the calibration body because, then, the forces for holding the calibration body (even under the action of ice pressure) are distributed across two different connections, and thus reliable positioning of the calibration body can be ensured even without a more stable construction of the dosing valve.

In accordance with another advantageous feature of the dosing valve of the invention, the calibration body has a two-part form. It is then possible for the calibration body to be composed of a calibration part, which supports the spring, and of a support component, which supports the first calibration part, wherein the cohesive or material connection is provided (only) on the second calibration part.

By virtue of the calibration body being divided in this way, it is possible for a calibration part to be disposed directly at the spring. The calibration part may particularly preferably also be connected to the dosing valve by using a press-fit connection by virtue of the calibration part being pressed into a duct section. The support component preferably bears directly against the calibration part. The support component may likewise be pressed-in. It is, however, also possible for the support component to merely bridge a distance from the first calibration part to an opening through which the calibration part and the support component are inserted in order that a cohesive or material connection can be formed in the vicinity of the opening. The support component can perform the additional function of reducing an internal volume of the dosing valve, in which the internal volume is filled with liquid additive.

In accordance with a further advantageous feature of the dosing valve of the invention, the calibration body has a sleeve-shaped form, and the duct has a duct section in which the calibration body can be positioned in order to thereby set the spring force exerted on the valve body by the spring.

The duct preferably has a cylindrical shape in sections and preferably has a circular cross-sectional area. The sleeve-shaped calibration body is preferably adapted to the cylindrical shape of the duct in such a way that the calibration body bears against the wall of the duct so that liquid additive cannot flow through between the calibration body and the wall of the duct, and instead a flow path of the liquid additive extends through the sleeve-shaped calibration body. The calibration body preferably has an (end-side) support section on which the spring is supported. The spring force of the spring, which is exerted on the valve body, preferably acts on the calibration body, at the opposite end of the spring in relation to the valve body. The spring is braced between the valve body and the calibration body. The duct section, which preferably has a cylindrical form in order to ensure that the calibration body can be positioned therein, is preferably constructed to be slightly longer than the calibration body in order to ensure that the position of the calibration body in the duct section can be varied within a range in order to compensate the manufacturing tolerances of the spring, as described further above. In the case of the two-part structural variant, described further above, with a calibration part and a support component, it is possible for the calibration part and/or the support component to have a sleeve-shaped construction. The calibration part is then a calibration sleeve, and the support component is then a support sleeve.

In accordance with an added advantageous feature of the dosing valve of the invention, the valve body bears against a closing seat when in the rest position, the dosing valve is closed in the rest position, and in order to open the dosing valve, the valve body can be moved away from the closing seat counter to the spring force.

The closing seat preferably forms that point of the dosing valve or of the valve housing against which the valve body bears in the rest position. The valve body and the closing seat together preferably interrupt the flow path through the dosing valve from the inlet to the outlet when the valve body bears against the closing seat. In the rest position, the dosing valve is preferably closed.

In another embodiment of the dosing valve, it may also be provided that the valve body bears against a stop when in the rest position, with the dosing valve being open in this state, whereas the dosing valve is closed when the valve body has been moved away from the stop counter to the spring force. The stop is then at the same time the closing seat.

In accordance with an additional advantageous feature of the dosing valve of the invention, the calibration body is connected to the dosing valve not only by using the cohesive or material connection but also by using a press-fit connection.

The calibration body is (as already described further above) preferably positioned in a duct section of a duct in the dosing valve. The calibration body, which preferably has a sleeve-shaped form, is preferably deformable in a radial direction. It is accordingly possible for the calibration body to initially be positioned in the duct section and then expanded in the radial direction so as to be pressed against a wall of the duct. Such a deformation preferably does not change the positioning of the calibration body in the axial direction (along the duct), which would cause the spring force exerted on the spring by the calibration body to be influenced.

If a press-fit connection is formed in addition to the cohesive or material connection in order to fasten the calibration body in the valve housing, it is particularly advantageously possible for a punctiform welded connection to also be formed for fixing the calibration body. During the formation of the press-fit connection, the calibration body can be at least locally deformed such that at least one punctiform region is formed in which the calibration body bears particularly firmly against the valve housing. The punctiform region may particularly advantageously be utilized for the purpose of conducting a current from the calibration body into the valve housing or vice versa in order to form a punctiform welded connection.

In accordance with yet another advantageous feature of the dosing valve of the invention, the dosing valve has an opening through which the fluid to be dosed can pass into the dosing valve, the calibration body furthermore extends from the spring to the opening, and the cohesive or material connection is disposed at an end, disposed at the opening, of the calibration body.

The described opening preferably simultaneously constitutes the inlet for the liquid additive into the dosing valve. Furthermore, the opening preferably simultaneously constitutes an inlet into the duct through the dosing valve, in which duct there is disposed the duct section in which the calibration body can be located. By virtue of the fact that the calibration body extends from the spring to the opening, it is made possible for the cohesive or material connection to be provided directly on that end of the calibration body which is disposed at the opening. The position of the cohesive or material connection is thus easily accessible, and the cohesive or material connection can be produced with little outlay. It must be considered in this case that the dosing valve opening which constitutes the inlet and into which the calibration body is preferably inserted has a relatively small cross section. If the calibration body extends as far as the opening, it is not necessary for a tool for producing the cohesive or material connection to extend far into the duct. The cohesive or material connection may, for example, be disposed at a distance of less than 5 mm [millimeters], preferably even less than 2 mm, from the opening.

With the objects of the invention in view, there is additionally provided a dosing valve, at least comprising a valve housing, with a duct and with a valve body which is movable so as to open and close the dosing valve, and having a spring which exerts a spring force on the valve body and thus holds the valve body in a rest position, wherein the spring is supported on a calibration body, the valve body, the spring and the calibration body are disposed in the duct, and the calibration body is screwed into the valve housing by way of a screw connection.

The screw connection constitutes a possible alternative to the cohesive or material connection, described further above, for fixing the calibration body. The use of the calibration body with a screw connection likewise permits a very firm connection between the calibration body and the dosing valve, which connection is capable of not being influenced by freezing of the liquid additive in the dosing valve. In order to ensure that a screw connection can be formed between the dosing valve and the calibration body, the dosing valve or the valve housing has a duct with a duct section which has a thread into which the calibration body can be screwed.

The particular advantages and structural features highlighted further above for the dosing valve with a cohesive or materially fastened calibration sleeve can be transferred and applied correspondingly to the dosing valve with the calibration sleeve fastened by way of a screw connection, insofar as this is technically expedient.

With the objects of the invention in view, there is also provided a method for producing a dosing valve, comprising at least the following steps:
  a) providing a valve housing having a duct;
  b1) inserting a valve body into the duct of the valve housing;
  b2) inserting a spring into the duct of the valve housing;
  b3) inserting a calibration body into the duct of the valve housing;
  c) tensioning the spring such that the spring exerts a predefined force on the valve body; and
  d) producing at least one cohesive or material connection between the calibration body and the valve housing.

The described method is particularly suitable for producing a dosing valve as described further above, the calibration body of which is fastened by using a cohesive or material connection.

In step a), there is (preferably) provided a valve housing which has a duct which extends from an inlet for the liquid additive to an outlet for the liquid additive. The duct is, in step a), preferably continuous from the inlet to the outlet. In step b1), the valve body is preferably inserted through an opening into the described duct in the valve housing. In step b2), a spring is additionally inserted into the duct so as to be in contact with the valve body. Subsequently, in step b3), the calibration body is inserted into the duct such that the spring is in contact with the calibration body. After step b3), the spring is situated between the valve body and the calibration body. In order to stress or tension the spring in step c), it is preferable for a tool to be inserted into the described duct with a defined force, wherein the tool exerts the predefined force on the calibration body. Due to the spring, the calibration body is then positioned such that the force is also transmitted to the spring. Subsequently, in step d), in the position assumed by the calibration body in step c), a cohesive or material connection is formed between the calibration body and the valve housing.

A dosing valve according to the invention can be produced in a particularly simple and inexpensive manner by using the method according to the invention. The described advantages and special structural features for the dosing valve can be transferred and applied to the method for producing a dosing valve. The same applies to the particular advantages and embodiment features highlighted with regard to the method, which can be applied and transferred to the dosing valve.

In accordance with another particularly advantageous mode of the method of the invention, the calibration body is pressed into the valve housing before step d). The calibration body is preferably pressed-in with such intensity that the calibration body already holds the spring in the predefined position under the conditions present before the execution of step d). The cohesive or material connection formed in step d) is then required in order to fasten the calibration body in such a way that it does not change its position even under usage conditions and, in particular, in the event of freezing of the liquid additive in the dosing valve and under the action of ice pressure. As a result of the calibration body additionally being pressed into the dosing valve, it can be achieved that the tool used for step c) for stressing the spring can even be moved away again before step d), and the cohesive or material connection can be produced by using a different tool. The tool used for step c) is preferably formed in such a way that it can perform the described pressing of the calibration body into the valve housing or into the duct in the valve housing after it has performed the positioning of the calibration body with the predefined force.

With the objects of the invention in view, there is concomitantly provided a motor vehicle, comprising at least an internal combustion engine, an exhaust-gas treatment device for the purification of the exhaust gases of the internal combustion engine, and a feed device for feeding an additive into the exhaust-gas treatment device, the feed device having a dosing valve according to the invention.

The invention is not restricted to dosing valves. The described valves and the valves produced in accordance with the described method may also be used for other applications in dosing systems for liquid additives (in particular reducing agent or urea-water solution) that are at risk of freezing. For example, the valves may be used as return valves in a return line in a dosing system in order to control a backflow of liquid additive from the dosing system back into a tank.

Other features which are considered as characteristic for the invention are set forth in the appended claims, noting that the features specified individually in the claims may be combined with one another in any desired technologically meaningful way and may be supplemented by explanatory facts from the description, with further embodiments of the invention being specified.

Although the invention is illustrated and described herein as embodied in a dosing valve for additives at risk of freezing, a method for producing a dosing valve and a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Referring now to the figures of the drawings in detail and first, particularly, to FIGS. 1 to 4 thereof, it is seen that numerous components therein correspond, so that these figures will initially be explained jointly herein, with the differences between the individual embodiments in the figures being discussed thereafter. FIGS. 1 to 4 each show a dosing valve 1 having a valve housing 6 through which a duct 7 extends. A valve body 2 is disposed in the duct 7. The valve body 2 is braced in the dosing valve 1 or in the valve housing 6 or in the duct 7 by a spring 3. For this purpose, the spring 3 is supported against a calibration body 4. The calibration body 4, the spring 3 and the valve body 2 are inserted into the valve housing 6 through an opening 11 of the duct 7. In this case, the calibration body 4 is situated in a duct section 8 of the duct 7. The spring 3 exerts a defined force on the valve body 2, which force presses the valve body 2 against a closing seat 9 and thus closes the dosing valve 1. In order to move the valve body 2 away from the closing seat 9 and thus to open a flow path 26 through the dosing valve 1 from an inlet 27 to an outlet 28, and thus to open the dosing valve 1, the valve body 2 can be moved counter to the spring force exerted by the spring 3 by using a non-illustrated drive. The dosing valve 1 or the valve housing 6 of the dosing valve 1 preferably has, on an outer surface, seals 25 with which the dosing valve 1 can be inserted in fluid-tight fashion into a feed device so that a liquid additive can be fed into an exhaust-gas treatment device. In a feed device of that type, the dosing valve 1 performs the task of adjusting the quantity of liquid additive fed by the feed device.

Figure 1:
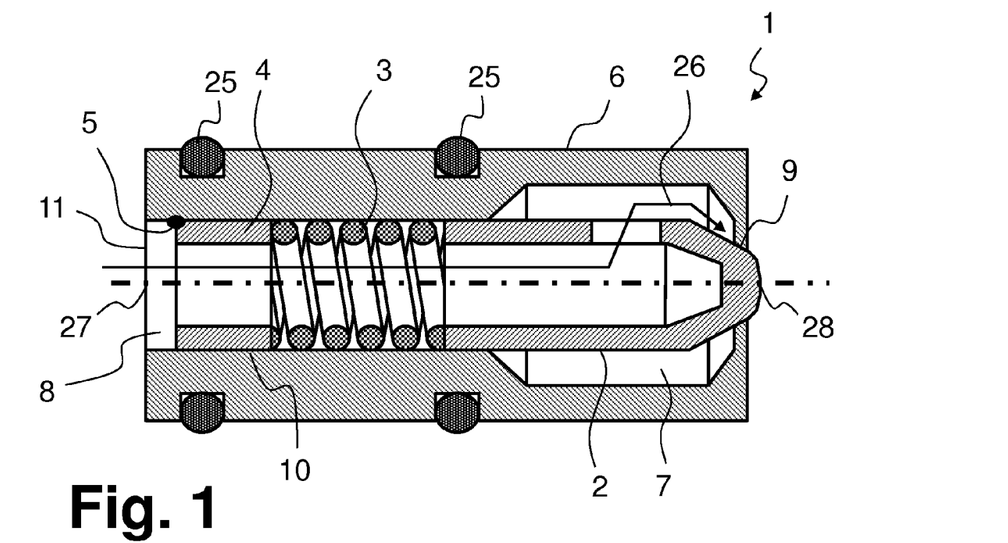
FIG. 1 is a diagrammatic, longitudinal-sectional view of a first embodiment of a dosing valve in a closed state.
Figure 2:
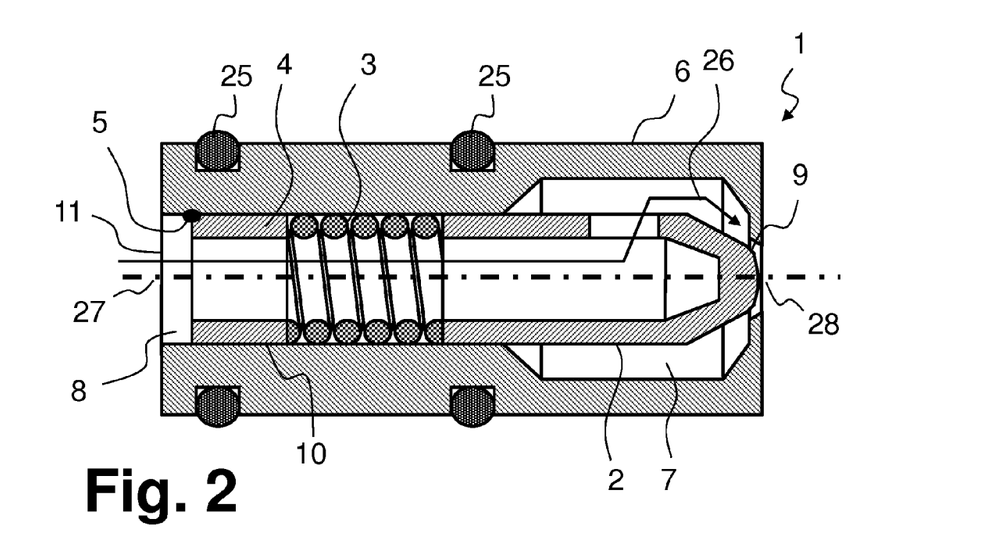
FIG. 2 is a longitudinal-sectional view of a first embodiment of a dosing valve in an open state.

In the embodiment of the dosing valve 1 according to FIGS. 1 and 2, the calibration body 4 is fastened in a duct section 8 of the duct 7 by using a cohesive or material connection 5. A press-fit connection 10 may also be used. FIG. 1 shows the structural variant of the dosing valve 1 in a closed state. In this case, the flow path 26 from the inlet 27 to the outlet 28 is interrupted. FIG. 2 shows this structural variant in an open state. The flow path 26 from the inlet 27 to the outlet 28 is established, and liquid additive can flow from the inlet 27 to the outlet 28 and subsequently emerge.

Figure 3:
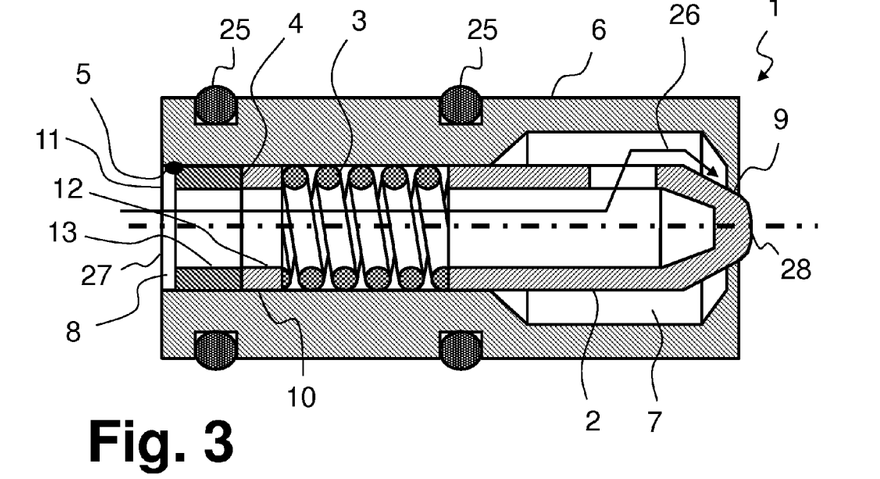
FIG. 3 is a longitudinal-sectional view of a second embodiment of a dosing valve.

In the embodiment of the dosing valve 1 according to FIG. 3, the calibration body 4 is divided into a calibration part 12 and a support component 13. The calibration part 12 supports the spring 3. The support component 13 in turn supports the calibration part 12. The cohesive or material connection 5 is formed on the support component 13. In this way, the cohesive or material connection 5 is disposed in the vicinity of the opening 11. A tool for forming the cohesive or material connection 5 therefore does not need to extend very far into the duct 7, and instead can remain in the vicinity of the opening 11.

Figure 4:
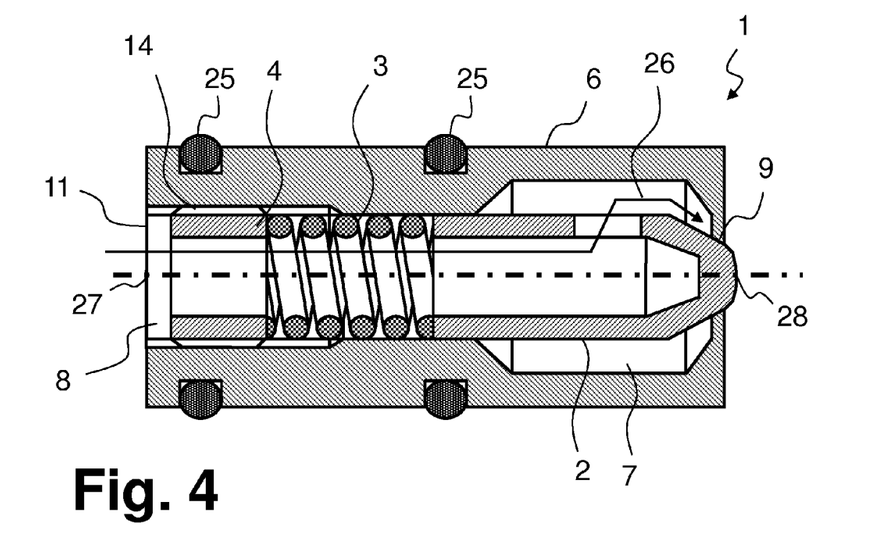
FIG. 4 is a longitudinal-sectional view of a third embodiment of a dosing valve.

In the embodiment according to FIG. 4, the duct section 8 is formed with a thread and the calibration body 4 is inserted, by way of a screw connection 14, into the thread of the duct section 8. By rotating the calibration body 4, the calibration body changes its position in relation to the spring 3, in such a way that the spring force can be defined by using a rotation or a screwing motion of the calibration body 4 into the screw connection 14.

Figure 5:
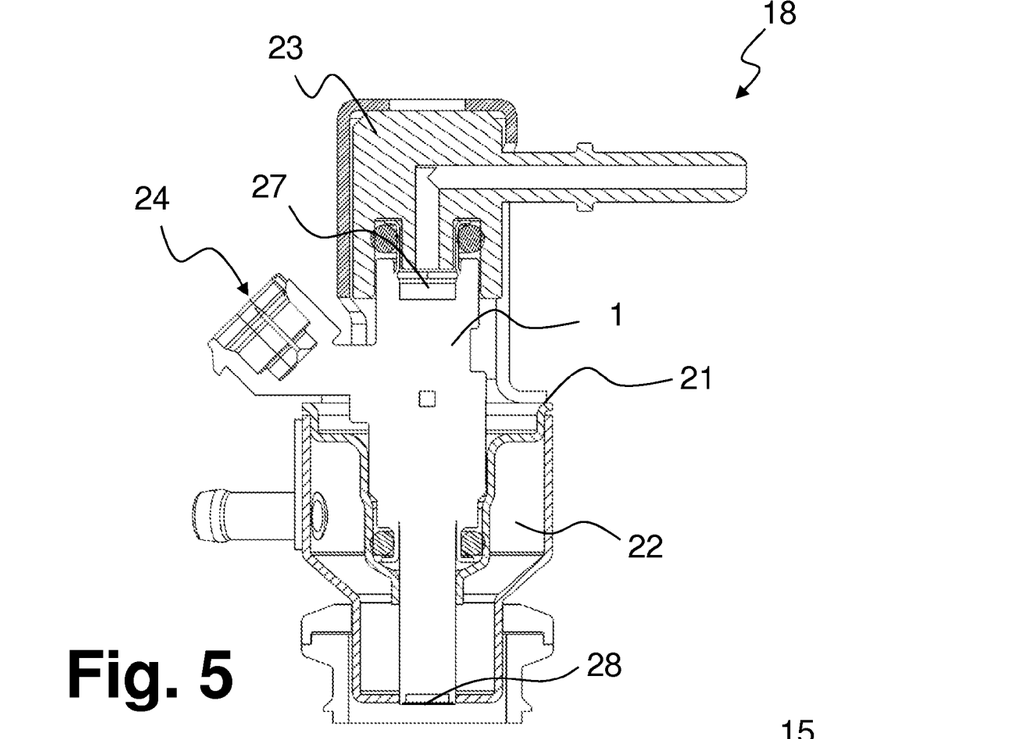
FIG. 5 is a longitudinal-sectional view of a feed device having a dosing valve.

FIG. 5 shows a feed device 18 with a dosing valve 1 inserted therein. The feed device 18 has a valve bracket 21 into which the dosing valve 1 is inserted. The dosing valve 1 is surrounded by a liquid-type cooling configuration 22. The liquid-type cooling configuration 22 is merely optional. A feed device 18 for the described dosing valve 1 may also be implemented without a liquid-type cooling configuration 22. The liquid-type cooling configuration 22 may be in the form of a cooling duct through which there flows a cooling medium which cools the dosing valve 1 during operation. The cooling medium may, for example, be the cooling liquid of an internal combustion engine, so that the liquid-type cooling configuration 22 is then connected to the cooling circuit of the internal combustion engine. An electrical terminal 24 of the dosing valve 1 is also shown in FIG. 5. A non-illustrated drive of the dosing valve 1 can be activated by way of the electrical terminal 24. The dosing valve 1 also has an inlet 27 and an outlet 28. A connector component 23, which is connected to the inlet 27, produces a fluidic connection for the liquid additive to the inlet 27 of the dosing valve 1.

Figure 6:
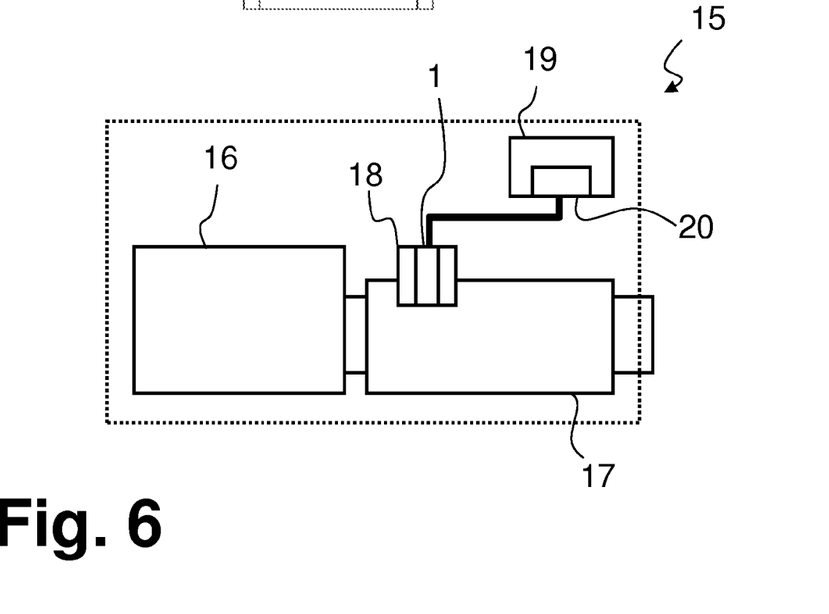
FIG. 6 is a block diagram of a motor vehicle having a dosing valve.

FIG. 6 shows a motor vehicle 15 having an internal combustion engine 16 and having an exhaust-gas treatment device 17 for the purification of exhaust gases of the internal combustion engine 16. The motor vehicle 15 also has a tank 19 in which liquid additive (for example urea-water solution) is stored. The liquid additive from the tank 19 can be delivered to a feed device 18 by a delivery unit 20 (for example a pump). Liquid additive can be fed to the exhaust-gas treatment device 17 by using a dosing valve 1 provided in the feed device 18.

The invention claimed is:

1. A dosing valve for dosing a liquid additive at risk of freezing, the dosing valve comprising:
   a valve housing having a duct formed therein defining an inner duct wall and a longitudinal axis, said valve housing having an inlet and an outlet defining a flow path therebetween for the liquid additive at risk of freezing;
   a hollow valve body through which said flow path passes partly along said longitudinal axis, said valve body disposed in said duct and movable to open and close the dosing valve;
   a spring disposed in said duct and exerting a spring force on said valve body to hold said valve body in a rest position, said spring configured to conduct the liquid additive at risk of freezing through said spring along part of said flow path; and at least one calibration body disposed in said duct, bearing against said inner duct wall and directly contacting and supporting said spring, said at least one calibration body being fastened in said valve housing by a press-fit connection and additionally by a brazed connection or a welded connection differing from said press-fit connection;

said press-fit connection being configured for fastening said calibration body in said valve housing causing said calibration body to hold said spring in a predefined position;

said brazed connection or said welded connection being configured for fastening said calibration body in said valve housing to prevent said calibration body from changing its position even under an action of ice pressure in the event of freezing of the liquid additive at risk of freezing in the dosing valve.

2. The dosing valve according to claim 1, wherein said calibration body is formed of two parts including a calibration part supporting said spring and a support part supporting said calibration part, and said brazed connection or welded connection is provided on said support part.

3. The dosing valve according to claim 1, wherein said calibration body is sleeve-shaped, said duct has a duct section, and said calibration body is disposed in said duct section and configured to be positioned to set a spring force exerted on said valve body by said spring.

4. The dosing valve according to claim 1, which further comprises:
a closing seat;
said valve body bearing against said closing seat in said rest position;
the dosing valve being closed in said rest position; and
said valve body configured to be moved away from said closing seat counter to a spring force of said spring to open the dosing valve;
said valve housing having an opening leading to said duct, said opening remaining open regardless of a position of said valve body.

5. The dosing valve according to claim 1, wherein said valve housing has an opening configured to pass a fluid to be dosed through said opening into the dosing valve, said calibration body extends from said spring to said opening, said calibration body has an end disposed at said opening, and said brazed connection or welded connection is disposed at said end of said calibration body.

6. A method for producing a dosing valve, the method comprising the following steps:
a) providing a valve housing having a duct formed therein defining an inner duct wall and a longitudinal axis, the valve housing having an inlet and an outlet defining a flow path therebetween for a liquid additive at risk of freezing;
b1) inserting a hollow valve body into the duct of the valve housing for conducting the flow path through the hollow valve body partly along the longitudinal axis;
b2) inserting a spring into the duct of the valve housing, the spring configured to conduct the liquid additive at risk of freezing through the spring along part of the flow path;
b3) inserting a calibration body into the duct of the valve housing, the calibration body bearing against the inner duct wall;

c) tensioning the spring and causing the spring to exert a predefined force on the valve body;
configuring the dosing valve for dosing the liquid additive at risk of freezing by:
d1) producing a press-fit connection between the calibration body and the valve housing, the press-fit connection being configured for fastening the calibration body in the valve housing to support and hold the spring in a predefined position by direct contact between the spring and the calibration body, before
d2) producing at least one brazed connection or welded connection between the calibration body and the valve housing, the brazed connection or welded connection being configured for fastening the calibration body in the valve housing to prevent the calibration body from changing its position even under an action of ice pressure in the event of freezing of the liquid additive at risk of freezing in the dosing valve; and
producing the press-fit connection and the brazed connection or welded connection by using a different tool.

7. The method according to claim 6, which further comprises carrying out step b1) then step b2) then step b3).

8. A motor vehicle, comprising:
an internal combustion engine;
an exhaust-gas treatment device configured to purify exhaust gases of said internal combustion engine; and
a feed device configured to feed an additive into said exhaust-gas treatment device, said feed device having a dosing valve according to claim 1.

9. The dosing valve according to claim 1, wherein said welded connection is a punctiform welded connection.

10. The dosing valve according to claim 1, wherein said welded connection includes multiple punctiform welded connections.

11. The dosing valve according to claim 10, wherein said multiple punctiform welded connections are disposed on a circumferential line running around said calibration body.

12. The dosing valve according to claim 1, wherein said welded connection is a linear welded connection encircling said calibration body.

13. The method according to claim 6, which further comprises welding the calibration body to the valve housing by friction welding in step d2).

14. The method according to claim 6, which further comprises:
welding the calibration body to the valve housing by friction welding in step d2); and
performing the friction welding by using a high-frequency rotational movement with an alternating direction of rotation of the calibration body relative to the valve housing.

15. The dosing valve according to claim 1, wherein said calibration body sets a spring force of said spring.

16. The dosing valve according to claim 1, wherein a quantity of the liquid additive dosed by the dosing valve is determined by an opening time of the dosing valve.

17. The method according to claim 6, which further comprises setting a spring force of the spring by using the calibration body.

18. The method according to claim 6, wherein a quantity of the liquid additive dosed by the dosing valve is determined by an opening time of the dosing valve.

19. The method according to claim 6, which further comprises providing an opening in the valve housing leading to the duct, closing the dosing valve by moving the valve body against a closing seat of the valve housing, opening the dosing valve by moving the valve body away from the closing seat, and keeping the opening in the valve housing open regardless of a position of the valve body.

20. A dosing valve for dosing a liquid additive at risk of freezing, the dosing valve comprising:
- a valve housing having a duct formed therein defining an inner duct wall and a longitudinal axis, said valve housing having an inlet and an outlet defining a flow path therebetween for the liquid additive at risk of freezing;
- a hollow valve body through which said flow path passes partly along said longitudinal axis, said valve body disposed in said duct and movable to open and close the dosing valve, said flow path issuing from said hollow valve body into said duct in a flow direction of the dosing valve from said inlet to said outlet;
- a spring disposed in said duct upstream of said hollow valve body in the flow direction and exerting a spring force on said valve body to hold said valve body in a rest position, said spring configured to conduct the liquid additive at risk of freezing through said spring along part of said flow path; and
- at least one calibration body disposed in said duct upstream of said spring in the flow direction, bearing against said inner duct wall and directly contacting and supporting said spring, said at least one calibration body being fastened in said valve housing by a press-fit connection and additionally by a brazed connection or a welded connection differing from said press-fit connection.

* * * * *